United States Patent [19]

Mukai et al.

[11] Patent Number: 4,978,199
[45] Date of Patent: Dec. 18, 1990

[54] FINDER OPTICAL SYSTEM

[75] Inventors: Hiromu Mukai; Etsuko Nakai, both of Osaka, Japan

[73] Assignee: Minolta Camera Kabushiki Kaisha, Osaka, Japan

[21] Appl. No.: 365,337

[22] Filed: Jun. 13, 1989

[30] Foreign Application Priority Data

Jun. 14, 1988 [JP] Japan .................. 63-147538

[51] Int. Cl.$^5$ ........................... G02B 5/04; G03B 9/40
[52] U.S. Cl. ..................... 350/286; 354/224; 350/622
[58] Field of Search ............. 350/286, 618, 622; 354/219, 224, 225

[56] References Cited

U.S. PATENT DOCUMENTS

| | | | |
|---|---|---|---|
| 2,161,623 | 6/1939 | Hensoldt | 350/286 |
| 4,309,078 | 1/1982 | Hara et al. | 350/286 |

FOREIGN PATENT DOCUMENTS

| | | | |
|---|---|---|---|
| 358065 | 9/1921 | Fed. Rep. of Germany | 350/286 |
| 297438 | 6/1952 | Japan . | |
| 51-163941 | 12/1976 | Japan . | |
| 56-27119 | 3/1981 | Japan . | |
| 57-182726 | 11/1982 | Japan . | |
| 1180934 | 2/1970 | United Kingdom | 354/224 |

OTHER PUBLICATIONS

Applied Optics, Oct. 1971, vol. 10, No. 10, pp. 2231–2234, High Precision 10-cm Apertive Penta and Roof-Penta Mirror Assemblies, by P. R. Yoder, Jr.

*Primary Examiner*—Rodney B. Bovernick
*Assistant Examiner*—Ronald M. Kachmarik
*Attorney, Agent, or Firm*—Price, Gess & Ubell

[57] ABSTRACT

A finder optical system comprises a first reflecting surface disposed at an image side of an objective lens to reflect light flux passing through the objective lens obliquely upward on the exit pupil side, a roof surface consisting of two reflecting surfaces orthogonally intersecting each other which is disposed obliquely upward on the exit pupil side of the first reflecting surface to perform right-left inversion of the light flux reflected by the first reflecting surface and to reflect the light flux obliquely downward on the exit pupil side, and a second reflecting surface disposed obliquely downward on the exit pupil side of the roof surface to perform an up-down inversion of the light flux reflected obliquely downward on the exit pupil side by the roof surface and reflect the light flux toward an eyepiece, and wherein the finder optical system fulfills the following condition: $20° < \theta < 40°$ wherein, $\theta$ represents an angle made by the first reflecting surface and an optical axis of the objective lens. Thereby, an optical path length in an erecting system can be shortened, and the finder optical system itself becomes long in the direction of the objective lens, and therefore a finder image without eclipse can be obtained at high magnification.

6 Claims, 6 Drawing Sheets

FINDER OPTICAL SYSTEM

BACKGROUND OF THE INVENTION

1. Field of the Invention

The present invention relates to a finder optical system, and more particularly to a finder optical system which utilizes light flux passing through a photo-taking lens (objective lens) and is applied to a video still camera or the like.

2. Description of the Prior Art

In comparison with a single lens reflex camera of 35 mm format, the video still camera using a solid state image device such as a CCD (charge coupled device) having a small image plane necessitates an eyepiece of short focal length capable of obtaining a high finder magnification. Accordingly, where a finder used for the single lens reflex camera is used for the video still camera, it is required to shorten the optical path length in an erecting optical system after the focal surface of the objective lens.

Also, in the video still camera, due to apparatuses such as an image signal processing circuit, the rear surface of the camera body protrudes greatly toward a pupil of the eye in comparison with the single lens reflex camera. Therefore in the video still camera having the eyepiece unit of a total length nearly equal to that of the conventional single lens reflex camera, the pupil of the eye cannot be brought close to the eyepiece and the light flux relating to the peripheral part of the finder image is eclipsed.

Furthermore, the pentagonal roof prism used for the single lens reflex camera leads to a small finder system in the direction of the objective lens in a manner that the light flux is reflected once toward the object side when an inverted image formed on the focal surface is restored to an erect image. Therefore where the pentagonal roof prism is used in the video still camera, it becomes increasingly difficult to reduce the distance between the eyepiece unit and the pupil of the eye.

Consequently, three principal conditions required for the erecting system of the finder optical system applied to the video still camera are as follows:

(1) The optical path length in the erecting system has to be shortened.

(2) The erecting system has to be brought close to the pupil of the eye.

(3) Up-down inversion and right-left inversion of the light flux of odd-number times are respectively required.

For the above-mentioned requirement (2), it could be considered to accommodate this requirement by elongating the total length of an eyepiece unit, but this is not so preferable because the magnification of the finder tends to be reduced as the total length of the eyepiece unit is elongated.

Now, considerations are made on the erecting system which fulfills the above-mentioned three requirements. First, from the viewpoint of shortening the optical path length and simplifying the constitution, up-down inversion and right-left inversion are performed once respectively. For this purpose, a constitution is considered which provides a roof surface performing right-left inversion and one reflecting flat surface facing this roof surface and performing up-down inversion. Furthermore, it is considered that to bring the erecting system close to the pupil of the eye, the light flux is reflected to the exit pupil side when right-left inversion is made. For such an erecting system, the system as disclosed in FIG. 1 of each of the Japanese Laid-Open Utility Patent Publications No. 163941/1976 and No. 182726/1982 (FIG. 1 of the present application) has been known, wherein the erecting system is constituted with a prism.

However, the above-mentioned erecting system presupposes to use the light flux which is incident on the objective lens and reflected in the vertical direction, and therefore this system is not yet enough to fulfill the above-mentioned requirements (1) and (2). In addition, it is very difficult to make the light flux projected from the erecting system horizontal i.e. parallel to the light flux incident on the objective lens, and if it is intended to be projected from the erecting system at an angle close to horizontal direction (direction of the objective lens), the optical path length in the erecting system becomes very long, and it becomes more and more difficult to fulfill the requirement (1).

SUMMARY OF THE INVENTION

It is an object of the present invention to provide a finder optical system suitable for the video still camera, which nicely fulfills the above-mentioned three requirements (1), (2) and (3), and has an erecting system also capable of projecting the light flux at an angle close to the horizontal direction.

In order to achieve such an object, the finder optical system according to one feature of the present invention comprises:

a first reflecting surface disposed at an image side of an objective lens to reflect light flux passing through the objective lens obliquely upward on the exit pupil side;

a roof surface consisting of two reflecting surfaces orthogonally intersecting each other which is disposed obliquely upward on the exit pupil side of said first reflecting surface to perform right-left inversion of the light flux reflected by said first reflecting surface and reflect the light flux obliquely downward on the exit pupil side; and a second reflecting surface disposed obliquely downward on the exit pupil side of said roof surface to perform up-down inversion of the light flux reflected obliquely downward on the exit pupil side by said roof surface and reflect the light flux toward an eyepiece; and wherein the finder optical system fulfills the following condition:

$$20° < \theta < 40°$$

wherein, $\theta$ represents an angle made by said first reflecting surface and an optical axis of the objective lens.

In accordance with the above-described feature of the present invention, the optical path length in the erecting system can be shortened, and the erecting system itself is brought close to the pupil of the eye, and therefore the focal length of the eyepiece can be set smaller and a finder image without eclipse is obtainable at a higher magnification.

Accordingly, the finder optical system of the present invention is suitable for a finder optical system of the video still camera wherein the image plane is small and the rear part of the camera body protrudes greatly. Furthermore, besides the finder optical system of the video still camera, the finder optical system according to the present invention can be used also for any camera which requires a finder optical system longer in the direction of an optical axis of the photo-taking lens wherein the optical path length is short.

The features of the present invention which are believed to be novel are set forth with particularity in the appended claims. The present invention, both as to its organization and manner of operation, together with further objects and advantages thereof, may best be understood by reference to the following description, taken in conjunction with the accompanying drawings.

DETAILED DESCRIPTION OF THE PREFERRED EMBODIMENTS

Hereinafter, the embodiments of the present invention will be described with reference to the drawings.

Figure 2:
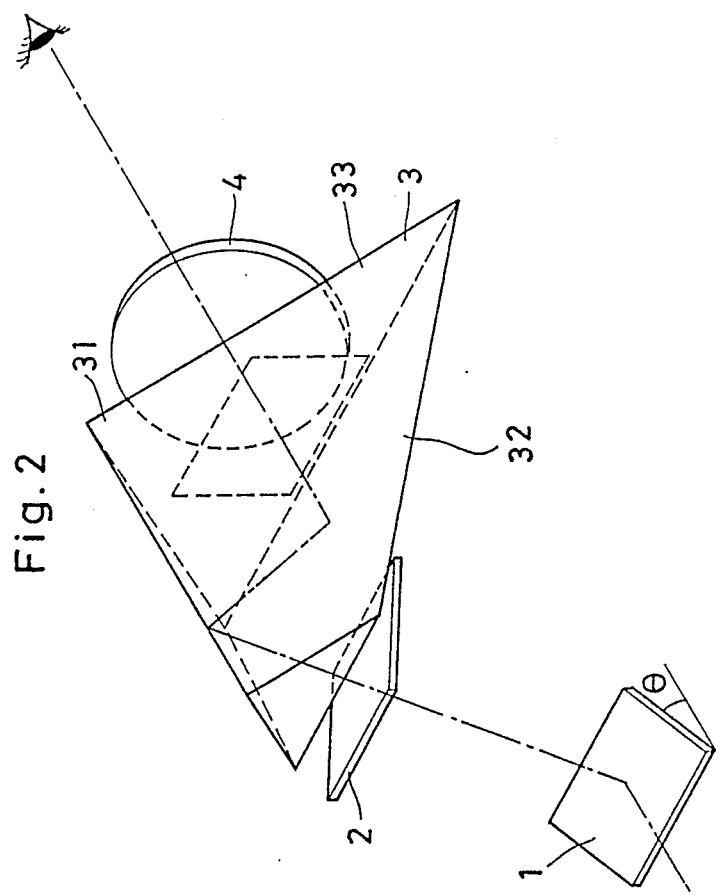
FIG. 2 is a perspective view showing one embodiment of the finder optical system in accordance with the present invention.
Figure 3:
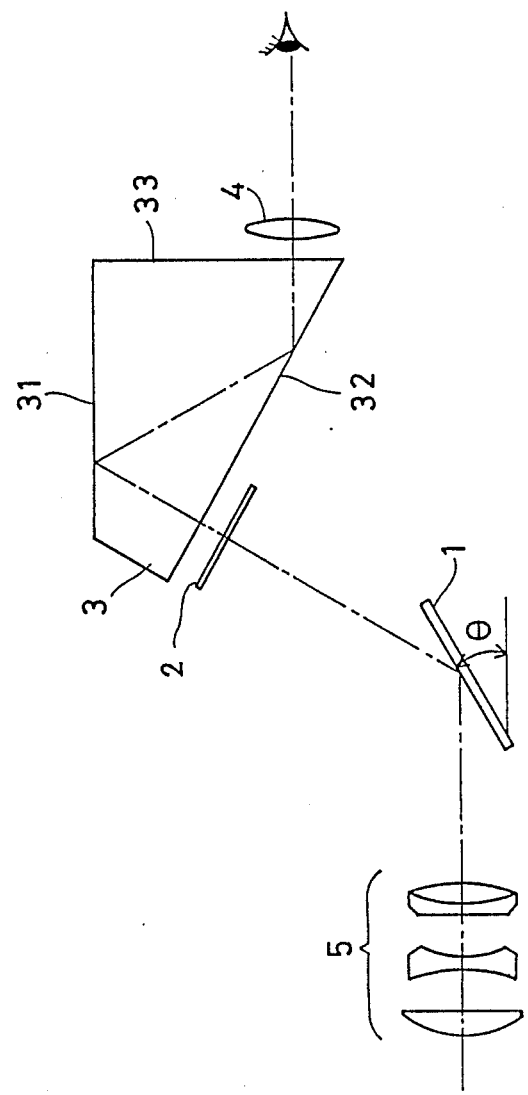
FIG. 3 is a cross-sectional view of the same.

FIG. 2 is a perspective view showing one embodiment of the finder optical system applying the present invention, and FIG. 3 is a cross-sectional view of the same. Light from an object incident on an objective lens 5 is reflected upward by a reflecting surface (mirror) 1, and the light from the object is led obliquely upward on the exit pupil side by setting an angle $\theta$ made by the reflecting surface 1 and the horizontal plane (an optical axis of the objective lens) to 20° through 40°. A focal plate 2 is installed at the position conjugate with an image plane (not illustrated) of a camera on the axis of the reflected light, and an erecting system 3 constituted with a prism made of glass or resin is disposed behind it. Also, behind an exit surface 33 of the erecting system 3, an eyepiece unit 4 is installed which magnifies an image of the object formed on the focal plate 2.

The erecting system 3 is constituted with a roof surface 31 consisting of two reflecting surfaces intersecting orthogonally and a second reflecting surface 32, and the light from the object incident on the erecting system 3 undergoes right-left inversion by the roof surface, and is reflected obliquely downward on the exit pupil side, and is further reflected by the second reflecting surface 32, thereby being projected from the exit surface 33 to the eyepiece unit 4 nearly in the horizontal direction.

In the video still camera, size is not limited so much in the upward direction, but apparatuses such as a signal processing circuit are disposed in the downward direction, and therefore it is preferable not to locate the erecting system 3 to extend downward excessively. When the angle $\theta$ made by the reflecting mirror 1 and the horizontal plane is set smaller than 20°, the erecting system 3 is lowered by all means, and the area of the reflecting surface 1 is inevitably widened, and the application to a practical camera becomes difficult. On the contrary, when the angle $\theta$ exceeds 40°, a problem takes place which is similar to the problem in the case of the conventional finder optical system which reflects the light flux passing through the objective lens in the vertical direction. Also, if a roof surface is adopted in place of the second reflecting surface 32 such a constitution is not so preferable because the erecting system 3 is disposed in the downward direction.

FIG. 4 through FIG. 7 show other embodiments of the erecting system 3 used for the finder optical system of the present invention, and the same members as those in FIG. 2 and FIG. 3 are indicated by the same reference numbers.

Figure 4:
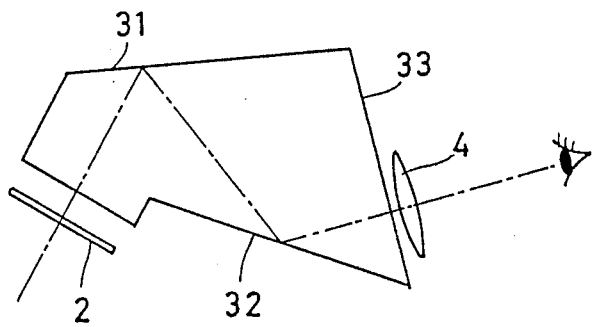
FIG. 4 through FIG. 7 are cross-sectional views showing other embodiments of the finder optical system of the present invention.

FIG. 4 shows a most general shape of the erecting system 3 constituted with a prism made of glass or resin.

Figure 5:
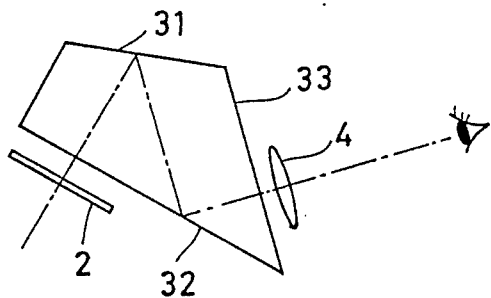

FIG. 5 shows the erecting system 3 of a prism wherein the second reflecting surface 32 and the surface of incidence of the light flux in the same plane like the embodiment as illustrated in FIG. 2 and FIG. 3, which can be manufactured most simply. Also, the problem of deterioration of chromatic aberration caused by the prism can be eliminated by placing the surface of incidence of this prism in parallel with the focal plate 2 and positioning the exit surface 33 perpendicularly to the optical axis.

Figure 6:
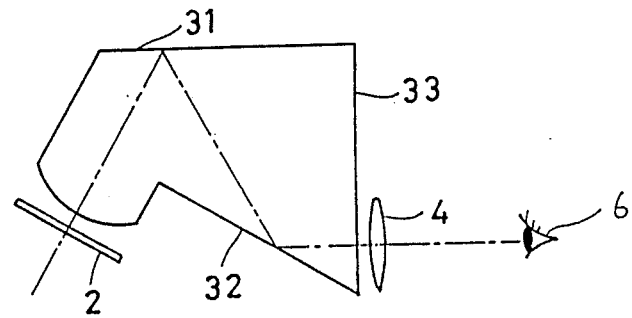

FIG. 6 shows an embodiment in which the surface of incidence is formed in a convex spherical surface (a concave spherical surface may be applicable in place of the concave spherical surface), and if the image of the pupil of the eye 6 projected by the eyepiece unit 4 is intended to be formed close to the exit pupil of the objective lens (in other words, if the pupil of the eye 6 is in conjugate relation with the exit pupil of the objective lens relative to the eyepiecee unit 4,), the conventional light converging system of a condenser lens or a Fresnal lens placed close to the focal surface can be dispensed with. Integral molding with resin is suitable for manufacturing such a prims.

Figure 7:
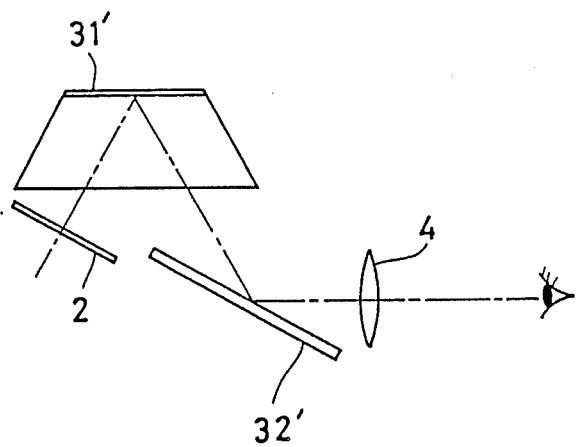

FIG. 7 shows an example of constitution of the erecting system 3 wherein a roof mirror 31' and a plane mirror 32' are used in place of the prims. This excels in cost and weight in comparison with the system using the prism.

In addition, the erecting system 3 using the prism has large angles of incidence of the light from the object into the roof surface 31 and the second reflecting surface 32, and therefore the roof surfaces 31 and the second reflecting surface 32 can be used as totally reflecting surfaces nearly independent of the refractive index of the prism, as a result, a reflection treatment of the roof surfaces 31 and the second reflecting surface 32 can be dispensed with, resulting in advantages in technique and cost.

Also, by suitably varying the angle $\theta$ made by the reflecting surface 1 and the horizontal plane (direction of the objective lens), the light flux projected to the exit pupil can be made nearly horizontal.

Figure 1:
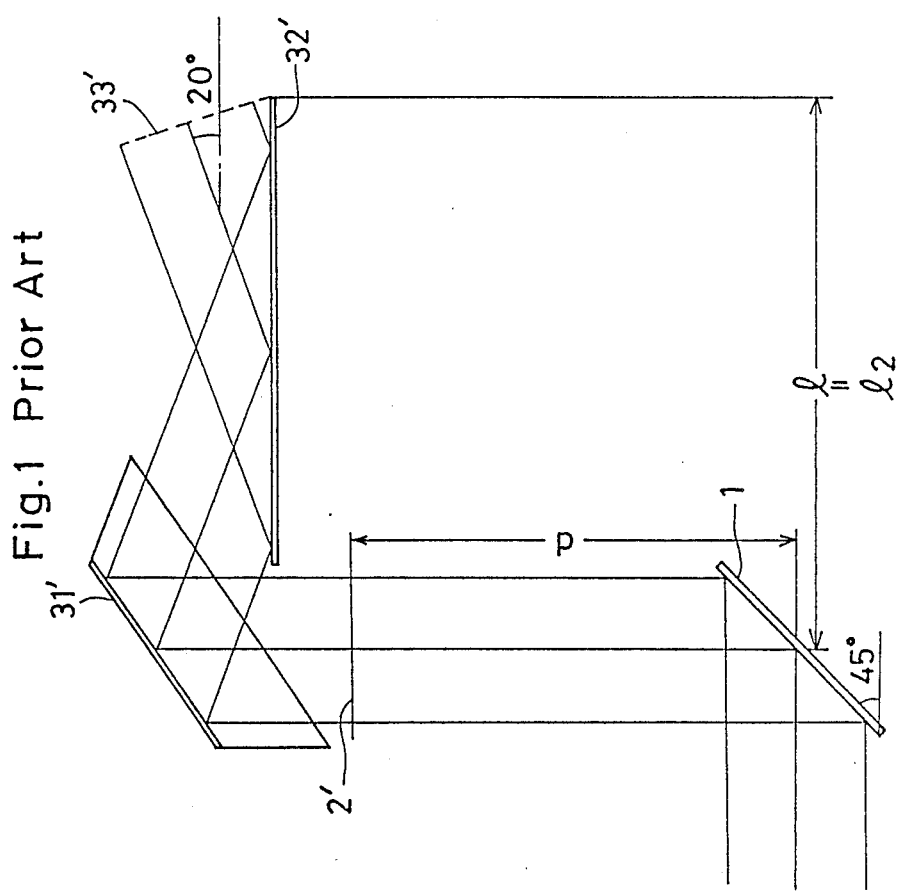
FIG. 1 is a view showing optical paths of the conventional finder optical system.
Figure 8:
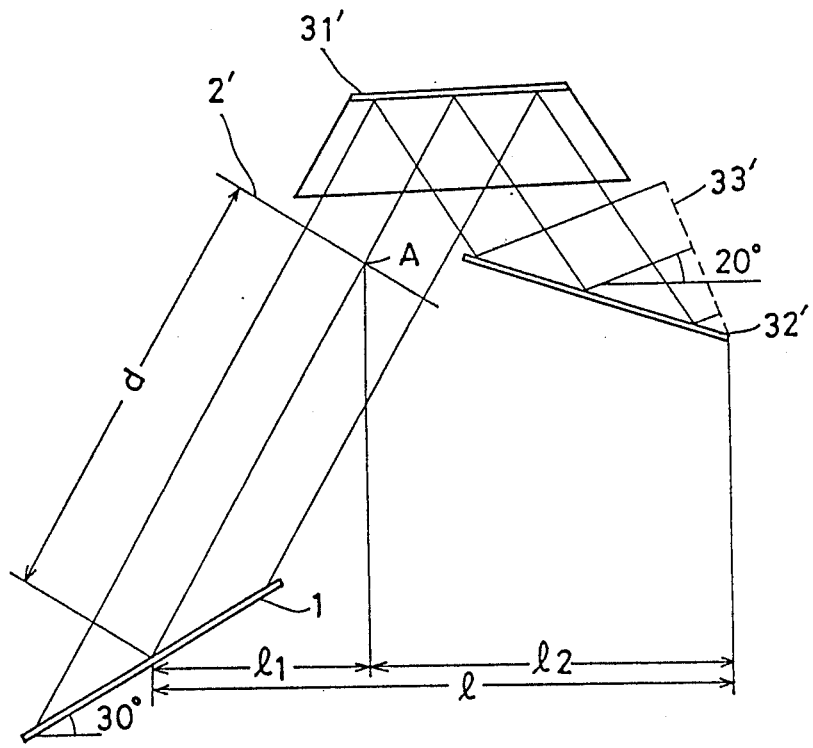
FIG. 8 is a view showing optical paths of the finder optical system of the present invention.

Here, description is made on aspects of changes, in an optical path length L of the erecting system 3 and a length l of the finder optical system in the direction of the photo-taking lens, which are caused by the angle $\theta$ made by the reflecting surface 1 and the horizontal plane based on FIG. 1 and FIG. 8. In FIG. 1 and FIG. 8, roof mirrors 31' and plane mirror 32' are used for the erecting system 3. Note that the finder optical system as shown in FIG. 1 is in the case where the angle $\theta$ is 45°, and FIG. 8 shows the case where the angle $\theta$ is 30°. Also, the optical path length L is an optical path length from a focal surface 2' to an exit surface 33' of the erecting system 3 (the exit surface is illustrated by a broken line in FIG. 1 and FIG. 8), and the distance l is a horizontal distance from the center of the reflecting surface 1 to the intersection of the plane mirror 32' and the exit surface 33' of the erecting system 3. Furthermore, as setting conditions, the angle of the light flux projected from the exit surface 33' to the horizontal plane is set to 20°, and a distance d from the center of the reflecting surface 1 to the focal surface 2' in the direction of the light flux reflected by the reflecting surface 1 is set to 15 mm.

The lower limit of the position of the erecting system 3 is determined by the apparatuses such as the solid state image device and the signal processing circuit. Also, the distance from the center of the reflecting surface 1 to the solid state image device, which is equal to distance d from the center of the reflecting surface 1 to the focal surface 2', is determined by a low-pass filter and the like disposed at the object side of the solid state image device. From these two conditions, 15 mm is the most adequate as the minimum value of the distance d. From this comparison, the case where the angle $\theta$ of the reflecting surface 1 is 30° becomes more advantageous as the distance d becomes longer, and therefore, here, 15 mm is adopted for the distance d.

Also, the light flux is assumed to be formed in a rectangle of 4.8 mm (short side) ×7.5 mm (long side) on the focal surface 2', and to make a comparison between FIG. 1 and FIG. 8 easy, the size and the shape of the light flux on the plane perpendicular to the optical axis is assumed not to be varied at any place other than the focal surface 2'.

The calculated results are shown in the following Table 1.

TABLE 1

|  | L | l | $l_1$ | $l_2$ |
| --- | --- | --- | --- | --- |
| $\theta = 30°$ | 17.8 mm | 19.9 mm | 7.5 mm | 12.4 mm |
| $\theta = 45°$ | 25.2 mm | 18.8 mm | 0 mm | 18.8 mm |

To obtain a finder image with high magnification, the focal length of the eyepiece unit 4 is required to be shortened, and for this purpose, the optical path length L should be short, and the case where the angle $\theta$ of the reflecting surface 1 is 30° is more advantageous.

The distance l is divided by the perpendicular line intersecting a center point A of the focal surface 2', and the reflecting surface 1 side is taken as $l_1$ and the erecting system 3 side as $l_2$. In the video still camera, the rear surface of the camera body protrudes greatly to the pupil of the eye, and therefore to obtain a finder image without eclipse, it is desirable to bring the eyepiece unit 4 close to the pupil of the eye by elongating the finder optical system in the direction of the photo-taking lens, and the case of $\theta=30°$ where the distance l is longer becomes advantageous. In addition, because $l_1$ is represented by $l_1 = d \cos 2\theta$, if $\theta=45°$, $\cos 2\theta$ equals 0 and $l_1$ is always 0. While if $\theta=30°$, the distance $l_1$ becomes longer as the distance d becomes longer, and this system as shown in FIG. 8 becomes more and more advantageous.

Consequently, in the case where the angle $\theta$ of the reflecting surface 1 to the horizontal plane is 30°, the optical path length L becomes shorter and the distance l becomes longer, and therefore a finder image having high magnification can be obtained without eclipse.

Although the present invention has been fully described by way of example with refererence to the accompanying drawings, it is to be noted here that various changes and modifications will be apparent to those skilled in the art. Therefore, unless otherwise such changes and modifications depart from the scope of the present invention, they should be construed as being included therein.

What is claimed is:
1. A finder optical system comprising:
   a first reflecting surface disposed at an image side of an objective lens to reflect light flux passing through the objective lens upward relative to an optical axis of the objective lens towards an exit pupil side;
   a roof surface consisting of two reflecting surfaces orthogonally intersecting each other which is disposed, on the exit pupil side of said first reflecting surface, to perform a right-left inversion of the light flux reflected by said first reflecting surface and to reflect the light flux downward towards the exit pupil side; and
   a second reflecting surface disposed downward relative to said roof surface to perform an up-down inversion of the light flux reflected downward toward the exit pupil side by said roof surface and to reflect the light flux towards an eyepiece, wherein the finder optical system fulfills the following condition:

$$20° < \theta < 40°$$

wherein, $\theta$ represents an angle made by said first reflecting surface and the optical axis of the objective lens.

2. A finder optical system as claimed in claim 1, wherein the light flux reflected by said second reflecting surface is in parallel with the light flux incident on the objective lens.

3. A finder optical system as claimed in claim 1, wherein said roof surface and said second reflecting surface are formed in one prism.

4. A finder optical system as claimed in claim 3, wherein said roof surface and said second reflecting surface formed in said prism are both totally reflecting surfaces.

5. A finder optical system as claimed in claim 3, wherein said prism is constituted by integral molding with resin.

6. A finder optical system as claimed in claim 1, wherein said roof surface and said second reflecting surface are constituted with a roof mirror and a plane mirror which are placed in air.

* * * * *